US011054870B2

(12) United States Patent
Subramaniam et al.

(10) Patent No.: US 11,054,870 B2
(45) Date of Patent: Jul. 6, 2021

(54) USER POSITION DETECTION (71) Applicant: Intel Corporation, Santa Clara, CA (US)

(72) Inventors: Gokul V. Subramaniam, Bangalore (IN); Arvind Sundaram, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/353,102

(22) Filed: Mar. 14, 2019

(65) Prior Publication Data
US 2019/0212787 A1 Jul. 11, 2019

(30) Foreign Application Priority Data

Jan. 8, 2019 (IN) .............................. 201941000883

(51) Int. Cl.
G06F 1/16 (2006.01)
G09G 5/37 (2006.01)
G06F 3/01 (2006.01)
G01K 7/02 (2006.01)

(52) U.S. Cl.
CPC .......... *G06F 1/1684* (2013.01); *G06F 1/1616* (2013.01); *G06F 3/011* (2013.01); *G06F 3/012* (2013.01); *G06F 3/013* (2013.01); *G09G 5/37* (2013.01); *G01K 7/02* (2013.01); *G09G 2354/00* (2013.01)

(58) Field of Classification Search
CPC ........... G06F 1/1684; G06F 3/012; G01J 5/12
See application file for complete search history.

(56) References Cited

U.S. PATENT DOCUMENTS

| 2012/0068952 | A1  |         | 3/2012 | Slaby et al. |                  |
|--------------|-----|---------|--------|--------------|------------------|
| 2015/0185806 | A1* | 7/2015  | S      | ..............| G06F 1/3231      |
|              |     |         |        |              | 713/323          |
| 2015/0261315 | A1* | 9/2015  | Alameh | ..............| G06F 3/03        |
|              |     |         |        |              | 345/156          |
| 2015/0265159 | A1* | 9/2015  | Lane   | ..............| A61B 5/7278      |
|              |     |         |        |              | 600/549          |
| 2017/0277228 | A1  | 9/2017  | Wong et al. |         |                  |
| 2018/0058936 | A1* | 3/2018  | Sun    | .............| G01J 1/4228      |
| 2018/0143006 | A1* | 5/2018  | White  | .............| G06F 3/014       |
| 2019/0189042 | A1* | 6/2019  | Aurongzeb | ........| G06F 1/1637     |

FOREIGN PATENT DOCUMENTS

DE    102019133429  A1    7/2020

OTHER PUBLICATIONS

Indian Office Action in Indian Patent Application No. 201941000883 dated Aug. 21, 2020, 4 pages.

* cited by examiner

*Primary Examiner* — Kevin M Nguyen
(74) *Attorney, Agent, or Firm* — Patent Capital Group (57) ABSTRACT

Particular embodiments described herein provide for an electronic device that can include a first housing, a second housing, where the second housing is rotatably coupled to the first housing using a hinge, and at least one thermal sensor to detect the position of a user relative to the electronic device, wherein the thermal sensor includes an array of thermopiles.

20 Claims, 10 Drawing Sheets

Distance Calculation

- Parameters needed before calculation
  - Ambient temp, $T^{amb}$
  - Temp of area measured, $T^{area}$
  - Half angle of Fresnel lens, $\Theta$

- $T^{area} = ((\pi x^2 - 3.25) \cdot T^{amb} + (3.25 \cdot 38.6))/(\pi x^2)$; Resolve for x in feet.

- Distance $y = x/\tan(\Theta)$; in feet

USER POSITION DETECTION

TECHNICAL FIELD

This disclosure relates in general to the field of computing, and more particularly, to a user position detection system.

BACKGROUND

End users have more electronic device choices than ever before. A number of prominent technological trends are currently afoot and these trends are changing the electronic device landscape. Some of the technological trends involve clamshell devices. Generally, clamshell devices are devices where a first housing is rotatably coupled to a second housing. For example, a laptop, notebook computer, etc., is a small, portable personal computer with a clamshell form factor typically having, a computer display mounted on the inside of an upper first housing of the clamshell and an alphanumeric keyboard on the inside of a lower second housing of the clamshell. The clamshell device is opened to use the device and folded shut for transportation or storage.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a user position detection system in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. The term "coupled" may mean one or more of the following. The term "coupled" may mean that two or more elements are in direct physical or electrical contact. However, the term "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Figure 1:
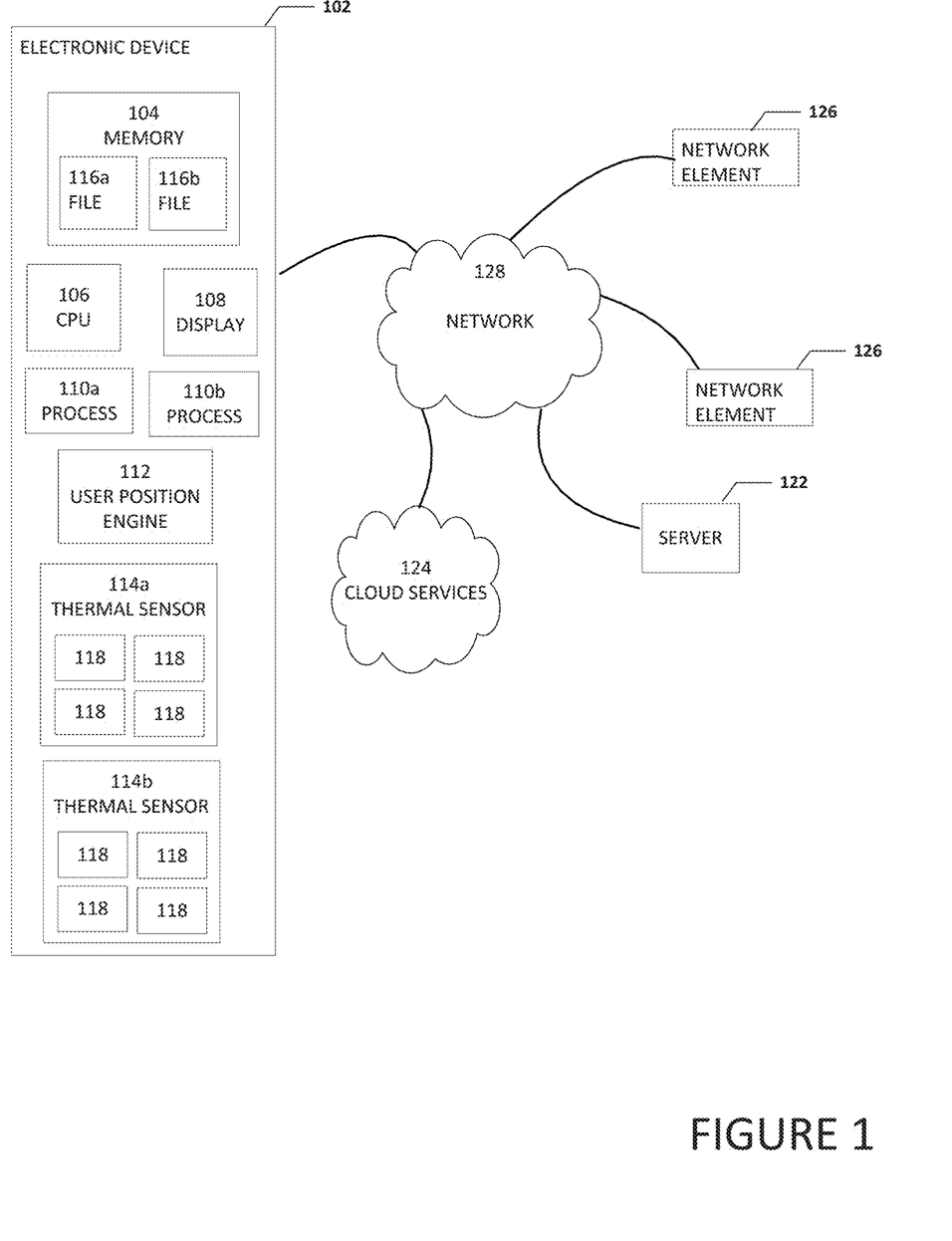
FIG. 1 is a simplified block diagram of a system to enable a user position detection system, in accordance with an embodiment of the present disclosure.

FIG. 1 is a simplified block diagram of an electronic device configured to enable a user position detection system, in accordance with an embodiment of the present disclosure. In an example, an electronic device 102 can include memory 104, one or more processors (CPU) 106, one or more displays 108, one or more processes 110a and 110b, a user position engine 112, and one or more thermal sensors 114a and 114b. Memory can include one or more files 116a and 116b. Each of thermal sensors 114a and 114b can include a plurality of thermopiles 118. Each thermopile 118 may be a thin film thermopile. Electronic device 102 may be in communication with a server 122, cloud services 124, and/or one or more network elements 126 using network 128.

Using plurality of thermopiles 118, thermal sensors 114a and 114b can be used to determine a position of a user relative to electronic device 102. More specifically, using plurality of thermopiles 118, thermal sensors 114a and 114b can detect the user in a plurality of zones relative to the electronic device. User position engine 112 can received data from each of thermal sensors 114a and 114b, determine a position of the user, and change or adjust an image displayed on display 108, alert the user to change positions to a more ergonomic position, change a configuration of display 108 and/or electronic device 102, and/or perform another action or cause another action or reconfiguration to occur. In a specific example, using data from thermal sensors 114a and 114b user position engine 112 can be configured to track an eye or eyes, face, head position, and/or other features of a user and determine a gaze of the user. The term "gaze" refers to a relative distance of the user's face and eyes from display 108, a position of the eyes relative to display 108, a pupil orientation relative to display 108, and/or a position of the head of the user relative to display 108.

The power output of each of plurality of thermopiles 118 is proportional to the temperature of the black body radiation from where the IR is generated and each of plurality of thermopiles 118 measures the spatial temperature. A thermopile is a collection of thermocouples that are, in general, connected in series to increase the output voltage. Thermopiles have a wide field of vision—as in they are not sensitive to the direction of the IR signal. The fundamental concept of the spatial temperature sensing is to restrict the field of vision of the thermopile by using a lens or a Fresnel lens. The lens allows PIR from only a certain region in space to reach the thermopile. The thermopile measures the temperature of the area of the field from where the PIR is generated. If a hot body enters the field, the measured temperature by the thermopile is equal to the (area of the hot body*temperature of the hot body)+(remaining area of the surrounding*temperature of the surrounding). Thus, a specific thermopile from plurality of thermopiles 118 is averaging the temperature of all bodies that is visible to the specific thermopile.

In an example, each of thermal sensors 114a and 114b could be an array of thermopiles that are not connected to each other. The array consists of independent cells of thermopiles. Each of these cells of thermopiles have their own field of view that is set by an independent sent of lenses or Fresnel lenses. The field of view of these cells are set in such a way that the FOV of the array is capable of sensing the front of the electronic device. When a user positions in front of the electronic device, depending on how far the user is and also the user's centering with respect to the electronic device, multiple center thermopiles register different "spatial" temperatures". Each of the thermopile's temperature reading indicates as to how much of its field of view is occupied by the user and this could be nil, full, or partial.

For partial overlap, the value of the temperature as compared to the ambient temperature gives an indication of how much of the thermopile's field of view is occupied by the user. By stitching data from all the thermopiles from an array of thermopiles, the user's positioned in front of the thermal sensor and the electronic device can be ascertained. The PIR cell image can also be compared with a known good user posture PIR cell image and/or proper ergonomic positioning and based on this feedback, a message can be communicated to the user regarding the user's posture and/or ergonomic positioning.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

Elements of FIG. 1 may be coupled to one another through one or more interfaces employing any suitable connections (wired or wireless), which provide viable pathways for network (e.g., network 128, etc.) communications. Additionally, any one or more of these elements of FIG. 1 may be combined or removed from the architecture based on particular configuration needs. Network 128 may include a configuration capable of transmission control protocol/Internet protocol (TCP/IP) communications for the transmission or reception of packets in a network. Electronic device 102 may also operate in conjunction with a user datagram protocol/IP (UDP/IP) or any other suitable protocol where appropriate and based on particular needs.

For purposes of illustrating certain example techniques of electronic device 102, the following foundational information may be viewed as a basis from which the present disclosure may be properly explained. Generally, clamshell devices are devices where a first housing is rotatably coupled to a second housing. For example, a clamshell device can be a laptop, notebook computer or other a small, portable personal computer with a clamshell form factor typically having a computer display mounted on the inside of an upper first housing of the clamshell and an alphanumeric keyboard on the inside of a lower second housing of the clamshell. The clamshell is opened to use the device and folded shut for transportation or storage.

It is commonly understood that current clamshell devices (e.g., laptops) are ergonomically flawed because the display is at a fixed height relative to the keyboard. The fixed height of the display can pose severe posture and ergonomic related problems to the user from prolonged usage, especially for mobile gamers that play their games on a clamshell device. In addition, 2 in 1 system form factors are going through a lot of change. Some systems come with multiple hinge setups that allow for many positions. With dual screen and multiple hinges, it is becoming more difficult to set the correct user posture. User posture needs to be adjusted for ergonomics every time the system position is changed. A user position system capable of sensing how the user is seated in relation to the device and give feedback to the user if the position is not correct is needed.

Some current systems can detect a user's position but the current systems have flaws. For example, RGB camera systems can detect a user presence and identify a user. However, there are privacy concerns with RGB camera. In addition, RGB camera systems can have a complex interface, consume a relatively large amount of power (e.g., over 100 mW of power consumption) and can add a relatively large amount of thickness to systems. Active infrared (IR) systems can detect a user presence and can detect depth using TOF, structured light, etc. with an additional IR camera. However, active IR camera systems can have a complex interface and require additional software to detect the presence of a user. In addition, IR camera systems can consume a relatively large amount of power (e.g., over 300 mW of power consumption) and can add a relatively large amount of thickness to systems. Passive IR systems can detect the presence of a user, have near zero power, and their range can exceed twelve (12) meters. However, many passive IR systems can only detect motion. In addition, pyro-sensor and quantum sensor based passive IR systems need software to deduce the presence of a user and thermopile based passive IR systems need a thermal reference to identify the presence of a user. Proximity sensor systems, both inductive and capacitive, are good with close range detection and multiple sensors can be used to detect basic gestures apart from presence. However, proximity sensor systems are only useful for close range detection and multiple arrays are needed for different usage angles. Electric field anomaly sensor-based systems can detect a user at far ranges but electric field anomaly sensor-based systems can be unstable and difficult to implement. What is needed is system and method that can help to detect a position of a user of an electronic device.

A system and method to help facilitate a user position detection system can resolve these issues (and others). In an example, an electronic device can include one or more thermal sensors (e.g., thermal sensors 114a and 114b). Each thermal sensor can be based on a spatial temperature averaging sensor (STAS) that uses a thin film thermopile (e.g., thermopile 118). The thin film thermopile is capable of detecting user IR and can create a thermal ID against a background. In addition, the one or more thermal sensors can use the thin film thermopile capability of detecting human IR and creating a thermal ID against a background to detect how far a user is from the system. The thermal sensors can consume less than 100 mW of power.

A multi-zoned thermal sensor system can be configured to detect the user in a plurality of zones (e.g., one of three zones) relative to an electronic device. This allows for a non camera based option and helps to eliminate or reduce privacy concerns that often are present with camera based systems. In addition, a multi-zoned thermal sensor system can have a relatively low, active power (e.g., an active power of 4.5 uW), a relatively low overall cost, can be configurable to satisfy design requirements, and can be scalable to meet different form factors. In addition, a multi-zone thermal sensor system does not have the computational requirements of current systems and the thermal sensors can be made flexible due to the thin film nature thin film thermopile. Further, a multi-zoned thermal sensor system can conform to 3D glass and flexible cover lens systems. Also, a multi-zoned thermal sensor system can have a simple four wire interface.

Turning to the infrastructure of FIG. 1, network 128 represents a series of points or nodes of interconnected communication paths for receiving and transmitting packets of information. Network 128 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 128, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

In an example implementation, electronic device 102, is meant to encompass an electronic device where a position of a user may need to be determined, especially a clamshell computer, computer that has a clamshell form factor, a laptop or electronic notebook, network elements that have a clamshell form factor, or any other device, component, element, or object that has a clamshell form factor, design, profile, etc. Electronic device 102 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 102 may include virtual elements.

In regards to the internal structure, electronic device 102 can include memory elements (e.g., memory 104) for storing information to be used in the operations outlined herein. Electronic device 102 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, electronic device 102 may include software modules (e.g., user position engine 112, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102 may include a processor (e.g., CPU 106) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
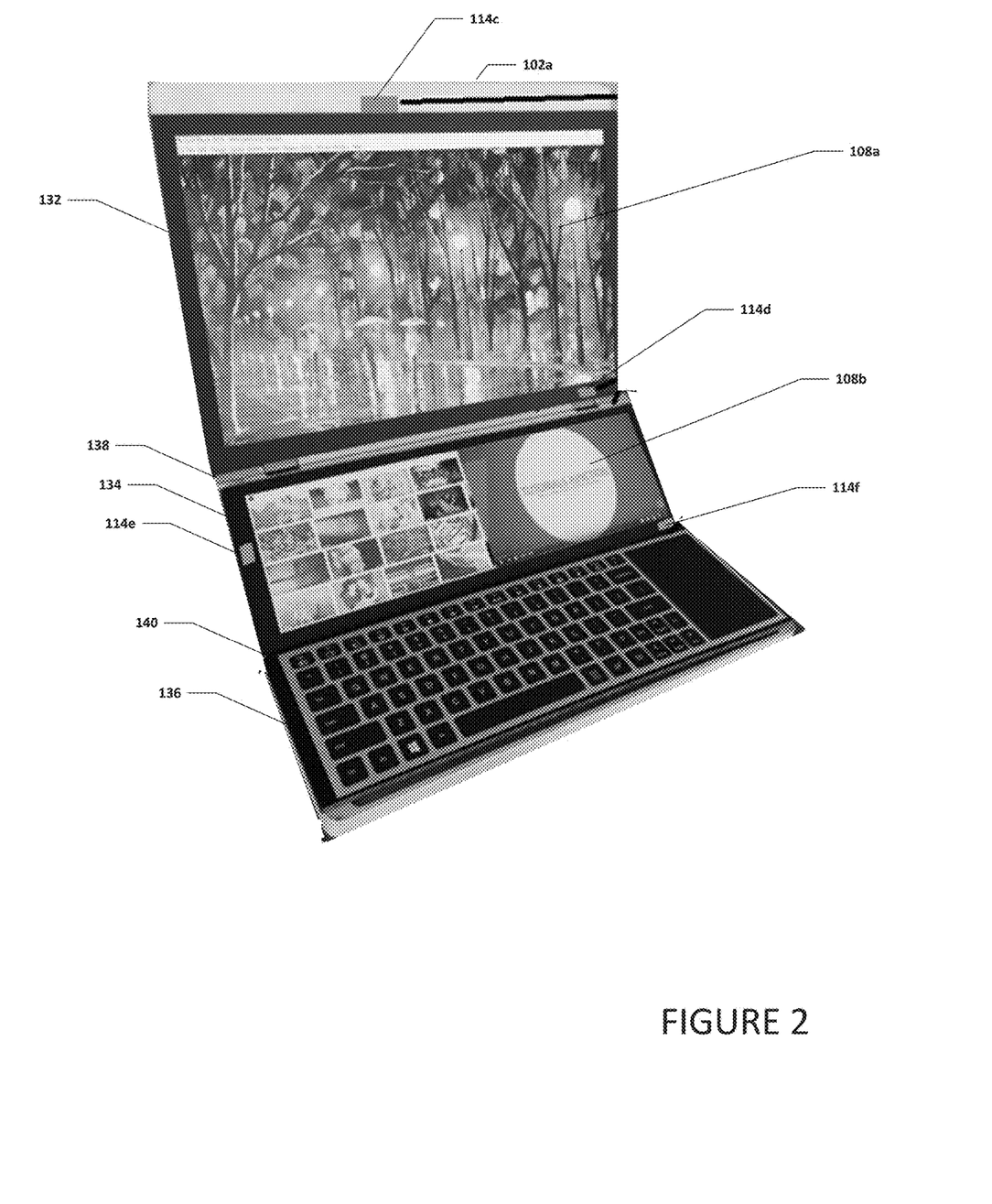
FIG. 2 is a simplified block diagram of a portion of a system to enable a user position detection system, in accordance with an embodiment of the present disclosure.
Figure 3A:
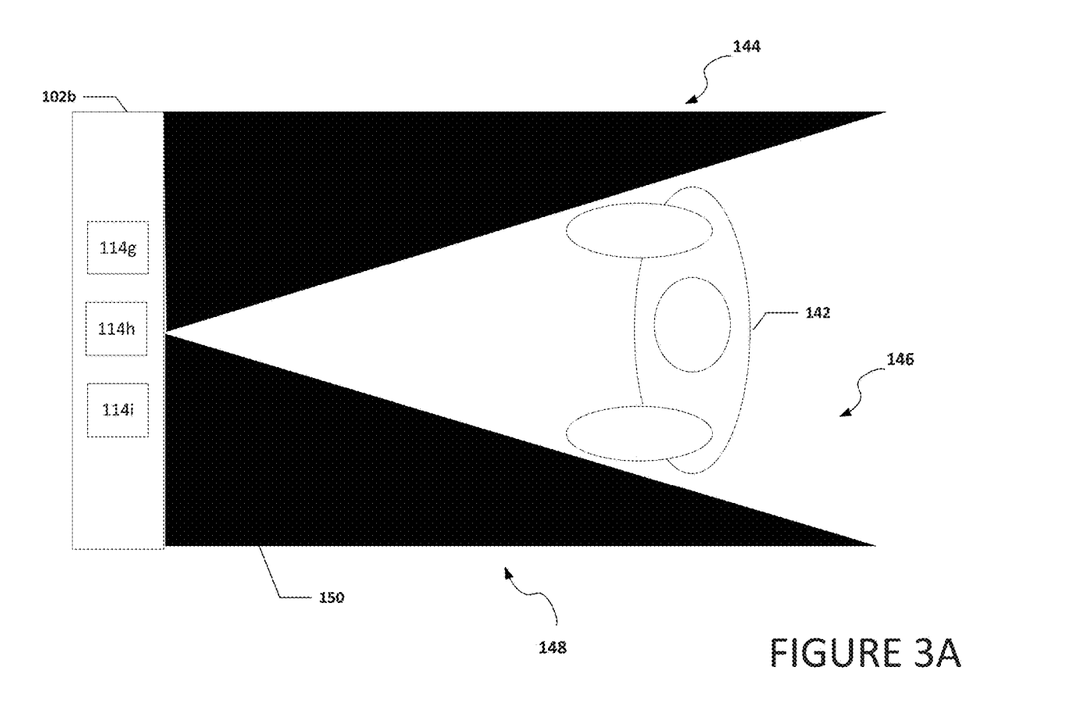
FIG. 3A is a simplified block diagram of a portion of a system to enable a user position detection system, in accordance with an embodiment of the present disclosure.
Figure 3B:
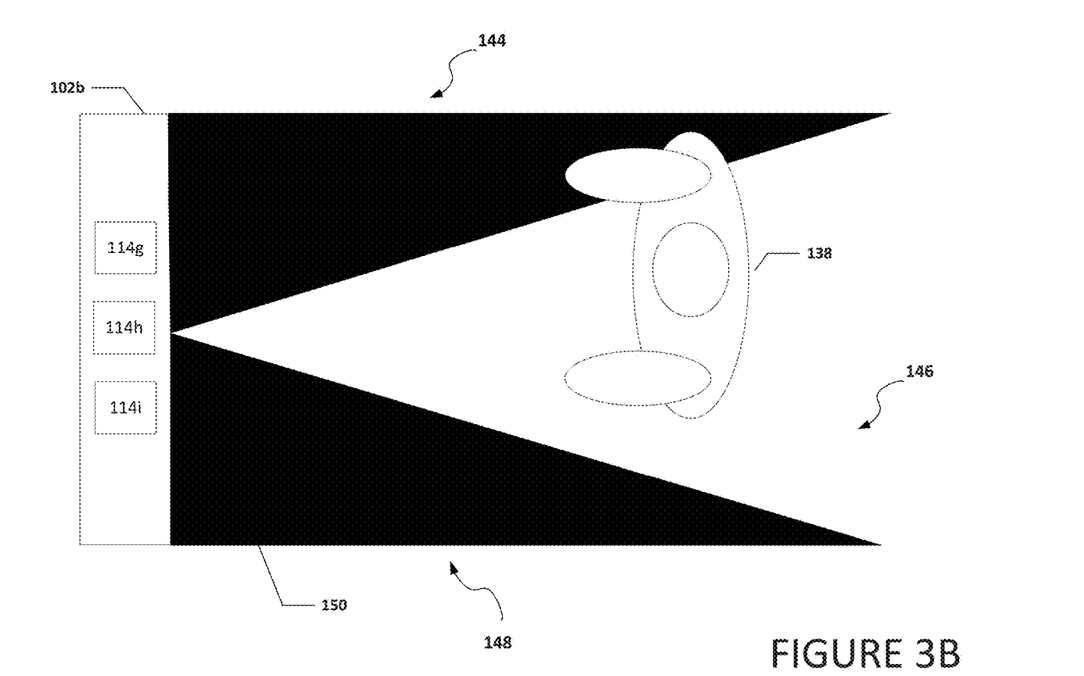
FIG. 3B is a simplified block diagram of a portion of a system to enable a user position detection system, in accordance with an embodiment of the present disclosure.

Turning to FIG. 2, FIG. 2 is a simplified block diagram of electronic device 102*a* configured to include a user position detection system. In an example, electronic device 102*a* can include a first display 108*a*, a second display 108*b*, one or more thermal sensors 114*d*-114*e*, a primary display housing 132, a secondary display housing 134, and a third housing 136. Primary display housing 132 can be rotatably coupled to secondary display housing 134 using a first hinge 138. Secondary display housing 134 can be rotatably coupled to third housing 136 using a second hinge 140. Primary display housing 132 can include first display 108*a* and one or more thermal sensors. For example, as illustrated in FIG. 2, primary display housing 132 includes thermal sensors 114*c* and 114*d*. Secondary display housing 134 can include second display 108*b* and one or more thermal sensors. For example, as illustrated in FIG. 2, secondary display housing 134 includes thermal sensors 114*e* and 114*f*. Third housing 136 can include a keyboard. Different configurations and numbers of thermal sensors may be used and the location of each thermal sensor and number of thermal sensors depends on design requirements, the level of granularity, the position or positions of the user to be determined, etc. One or more of thermal sources 114*c*-114*f* may be used to determine the position of a user. User position engine 112 can receive data from one or more of thermal sensors 114*c*-114*f* and change what is displayed on display 108, alert the user to change positions to a more ergonomic position, change a configuration of display 108 and/or electronic device 102, and/or perform another action or cause another action or reconfiguration to occur Turning to FIGS. 3A and 3B, FIGS. 3A and 3B are simplified block diagram of electronic device 102 configured to include a user position detection system. In an example, electronic device 102*b* can include three thermal sensors, thermal sensors 114*g*-114*i*. Each thermal sensor 114*g*-114*i* can be associated with or focused on a specific zone or area in relation to electronic device 102*b*. For example, thermal sensor 114*g* can be associated with or focused on an area 144 and can detect when a user 142 is in area 144, thermal sensor 114*h* can be associated with or focused on an area 146 and can detect when user 142 is in area 146, and thermal sensor 114*i* can be associated with or focused on an area 148 and can detect when user 142 is in area 148. For a user to be viewing a middle portion 150 of electronic device 102*b*, the user needs to be in area 146, as illustrated in FIG. 3A. If the user is leaning or sitting too far to the right (as illustrated in FIG. 3B) or to the left, thermal sensor 114*g* can detect when user 142 is in area 144.

To focus a thermal sensor to a specific zone or area, a thin film Fresnel lenses may be used. In an example, a Fresnel lens may be over or associated with each thermopile in the thermal sensor. The Fresnel lenses can be over a cover glass and create a narrow field of view (FOV). An array of thermopiles 118 (not shown) coupled with Fresnel lens packs can create different field of views. If a thermal sensor is used without FOV restriction, the thermal sensor will sense everything. Specific IR filters that restrict the PIR range between about eight (8) to about twelve (12) um may also be used.

User position engine 112 is configured to determine the position of the user with respect to how electronic device is oriented. User position engine 112 is configured to determine how the user is seated in relation to the electronic device. This is why the restricted FOV of the array of thermopiles is used. If the user is seated correctly in front of the array of thermopiles, all the sensors can detect the position that is expected. If one array of thermopiles is not giving the correct expected result, the system can determine what is missing and notify the user.

The array of thermopiles can determine the average remote temperature and each thermopiles's FOV is restricted using Fresnel lenses and IR filters. The array of thermopiles measures the passive IR (PIR) present in its FOV. If the entire FOV is only background with no hot body, the thermopiles can read out an ambient temperature. In an example, if the entire FOV is only background with no hot body, the thermopiles can read out a remote average temperature. The remote average temperature includes a restriction of PIR radiation, a restriction of FOV, a thermal mass to keep a cold junction anchored at a fixed temperature, the cold junction temperature, the thermopile reading and the remote FOV temperature, and in some examples, an ambient temperature measured by alternate means. The FOV average can be determined and an overlap of the user to the ambient temperature is computed, using the averaging concept to detect the pieces of the FOV which the user occupies.

Figure 4:
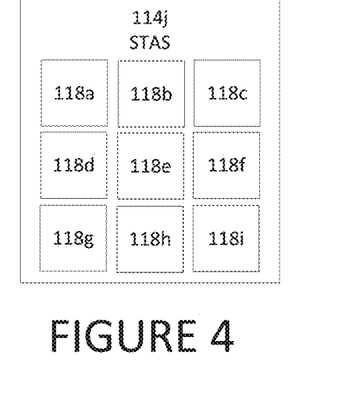
FIG. 4 is a simplified block diagram of a portion of a system to enable a user position detection system, in accordance with an embodiment of the present disclosure.

Turning to FIG. 4, FIG. 4 is a simplified block diagram of a portion of an electronic device configured to include a user position detection system. In an example, a thermal sensor 114g can include a three-by-three array of thermopiles 118a-118i. Individually, each of thermopile 118a-118i can be used to sense the presence of a user and each of thermopile 118a-118i can have a different viewing cone. In an example, the different viewing cone of each thermopile 118a-118i is achieved using one or more Fresnel lenses. Warm body objects (like a user) are determined by each of thermopile 118a-118i when the user enters the cone associated with the thermopile. Based on how the user is positioned in front of the system, only a number of thermopiles register a user in front of them. The rest of the thermopiles do not register a user. If the correct set of thermopiles are registering a user, this leads user position engine 112 to determine that the user is seated properly. If the user moves, the thermopile measurement pattern changes and this can trigger a response from the user position engine 112.

Figure 5A:
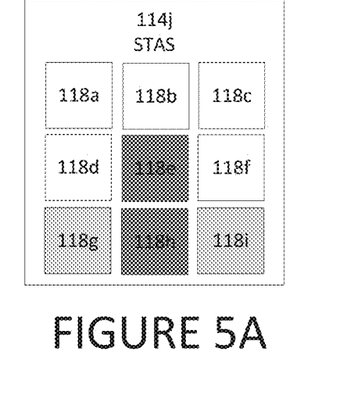
FIG. 5A is a simplified block diagram of a portion of a system to enable a user position detection system, in accordance with an embodiment of the present disclosure.

Turning to FIGS. 5A-5E, FIGS. 5A-5E are a simplified block diagram of a portion of an electronic device configured to include a user position detection system. As illustrated in FIGS. 5A-5E, thermal sensor 114g can include a three-by-three array of thermopiles 118a-118i. When the user is positioned correct, as illustrated in FIG. 5A, four thermopiles 122e and 122h are registering a hot body with thermopiles 118g and 118i registering partial body visibility. When a body is partially visible, the average temperature measured is mid-way between the ambient temperature and or the remote average temperature and human body temperature.

Figure 5B:
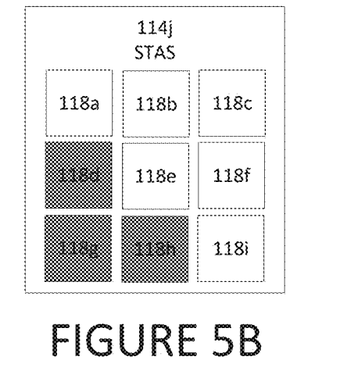
FIG. 5B is a simplified block diagram of a portion of a system to enable a user position detection system, in accordance with an embodiment of the present disclosure.
Figure 5C:
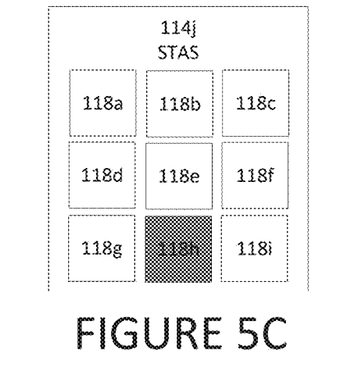
FIG. 5C is a simplified block diagram of a portion of a system to enable a user position detection system, in accordance with an embodiment of the present disclosure.
Figure 5D:
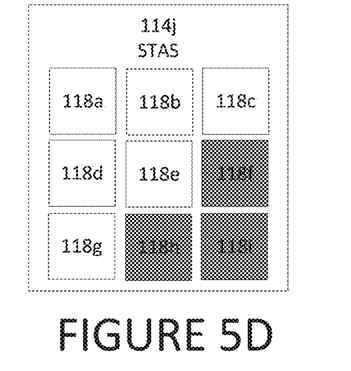
FIG. 5D is a simplified block diagram of a portion of a system to enable a user position detection system, in accordance with an embodiment of the present disclosure.
Figure 5E:
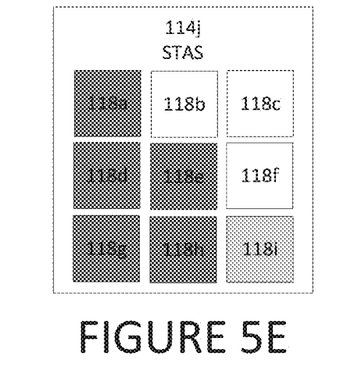
FIG. 5E is a simplified block diagram of a portion of a system to enable a user position detection system, in accordance with an embodiment of the present disclosure.

As illustrated in FIGS. 5B-5E, based on user position, different tiles register different temperatures which gives an indication of how the user is positioned relative to the electronic device (e.g., electronic device 102) that includes the thermopile. For example, as illustrated in FIG. 5B, thermopiles 118d, 118g, and 118h register a hot body which can indicate the user is positioned or leaning towards the left relative to the electronic device. As illustrated in FIG. 5C, only thermopile 118h registers a hot body which can indicate the user is positioned or leaning too low relative to the electronic device. As illustrated in FIG. 5D, thermopiles 118f, 118h, and 118i registers a hot body which can indicate the user is positioned or leaning to the right relative to the electronic device. As illustrated in FIG. 5E, thermopiles 118a, 118d, 118e, 118g and 118h register a hot body and thermopile 118i is registers partial body visibility which can indicate the user is positioned too high and leaning towards the left relative to the electronic device.

Figure 6:
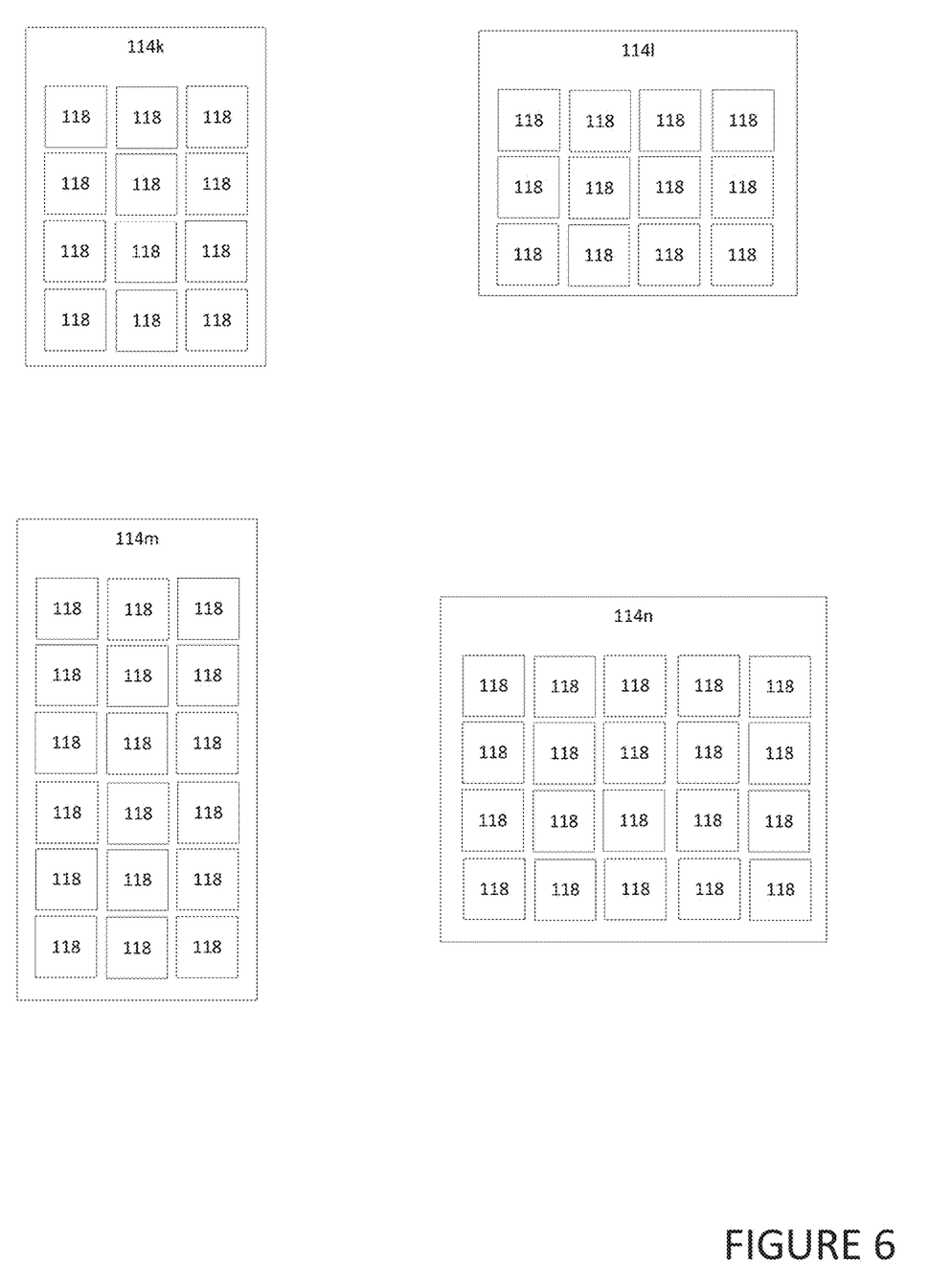
FIG. 6 is a simplified block diagram of a portion of a system to enable a user position detection system, in accordance with an embodiment of the present disclosure.

Turning to FIG. 6, FIG. 6 is a simplified block diagram of a portion of electronic device 102 configured to include a user position detection system. As illustrated in FIG. 6, each thermal sensor may be a different sized array or matrix of thermopiles. For example, as illustrate in FIG. 6, thermal sensor 114k includes a three-by-four (3×4) array of thermopiles 118. Thermal sensor 114l includes a four-by-three (4×3) array of thermopiles 118. Thermal sensor 114m includes a three-by-six (3×6) array of thermopiles 118. Thermal sensor 114n includes a five-by-four (5×4) array of thermopiles 118. It should be notes that other arrays can be use (e.g., 6×6, 4×8, 2×12, 6×16, 8×20, etc.).

Figure 7:
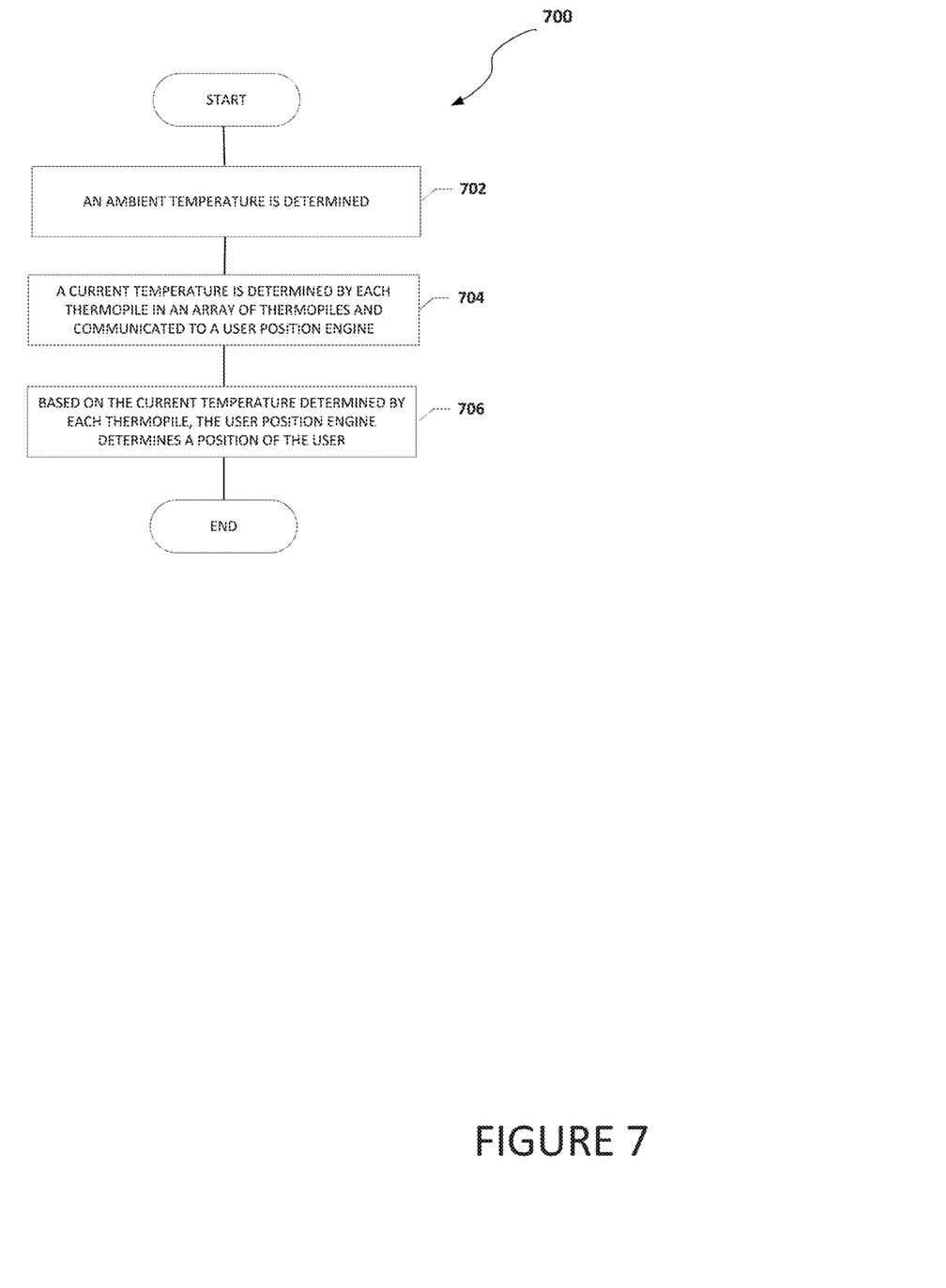
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with a user position detection system, in accordance with an embodiment. In an embodiment, one or more operations of flow 700 may be performed by user position engine 112. At 702, an ambient temperature is determined. In an example, a remote average temperature is determined. At 704, a current temperature (a current temperature value) is determined by each thermopile in an array of thermopiles and communicated to a user position engine. At 706, based on the current temperature determined by each thermopile, the user position engine determines a position of the user.

Figure 8:
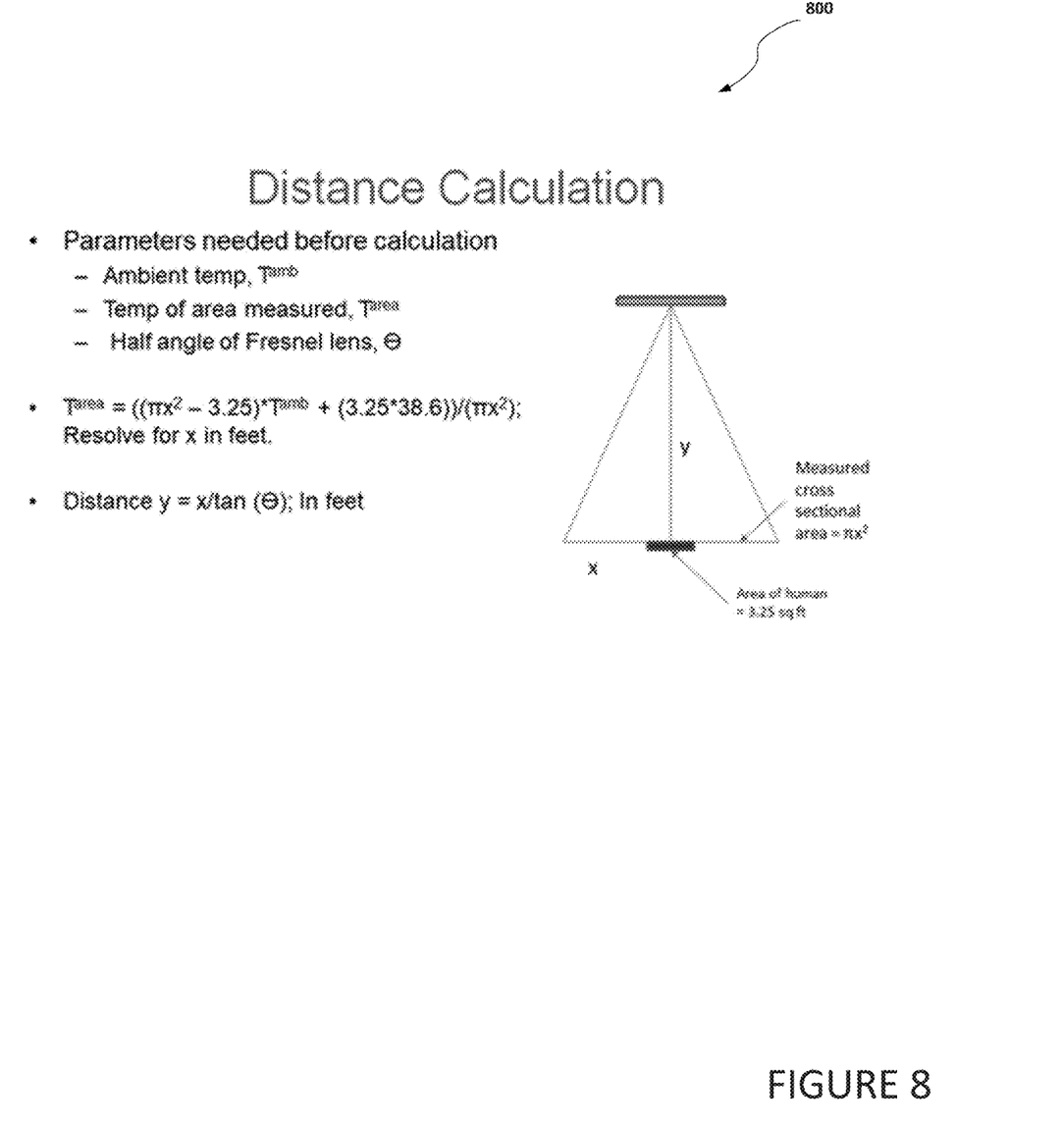
FIG. 8 is a simplified diagram illustrating examples details of a system to enable a user position detection system, in accordance with an embodiment of the present disclosure.

Turning to FIG. 8, FIG. 8 is a simplified diagram illustrating examples details of a user position detection system. As illustrated in FIG. 8, a distance calculation 800 can be used (e.g., by user position engine 11)2 to determine a position of a user relative to an electronic device (e.g., electronic device 102). In a specific example, the distance calculation includes an ambient temperature value, a current temperature of an area measured by a thermopile, and a half angle of a Fresnel lens.

Figure 9:
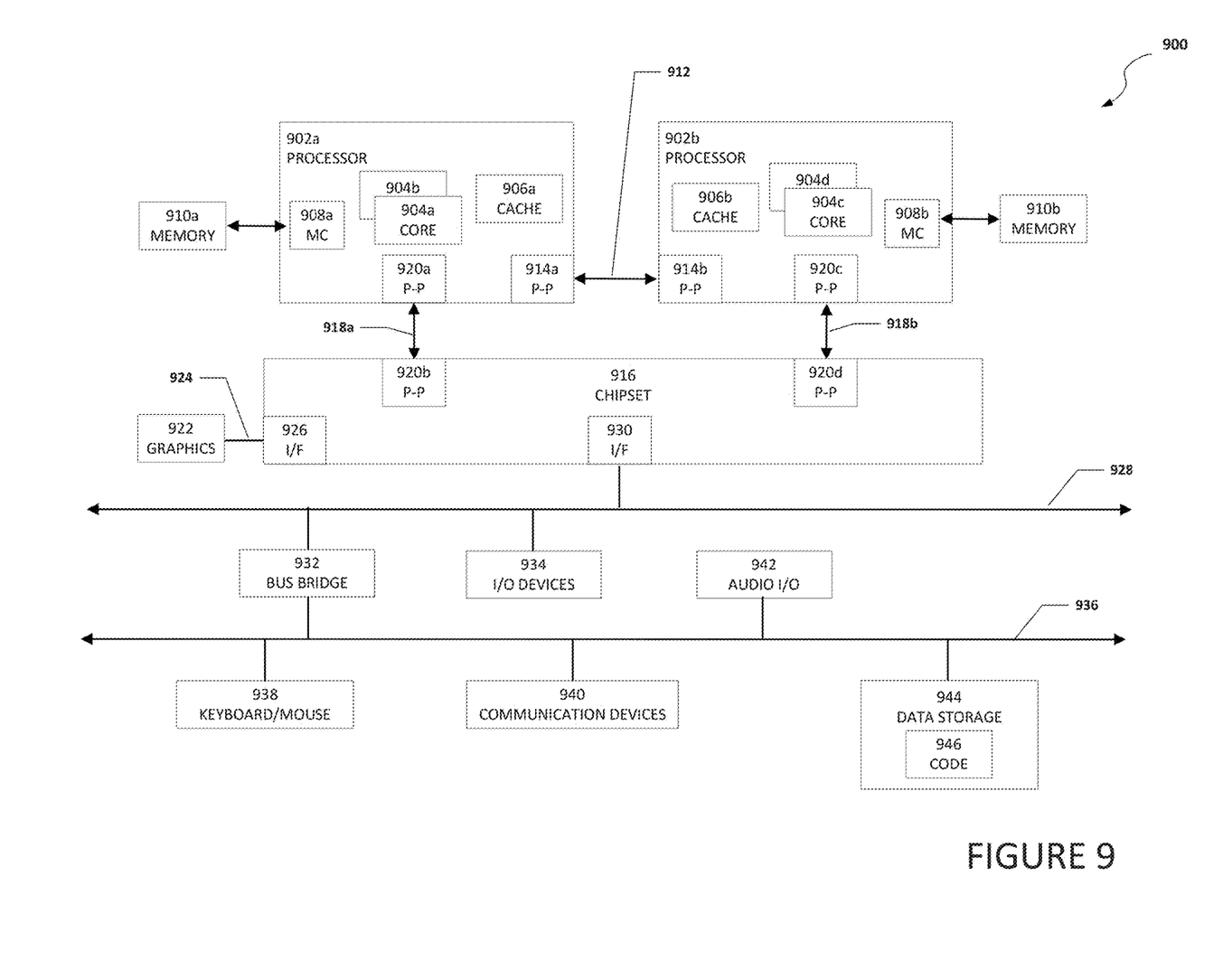
FIG. 9 is a block diagram illustrating an example computing system that is arranged in a point-to-point configuration in accordance with an embodiment.

Turning to FIG. 9, FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of system 100 may be configured in the same or similar manner as computing system 900.

As illustrated in FIG. 9, system 900 may include several processors, of which only two, processors 902a and 902b, are shown for clarity. While two processors 902a and 902b are shown, it is to be understood that an embodiment of system 900 may also include only one such processor. Processors 902a and 902b may each include a set of cores (i.e., processors cores 904a and 904b and processors cores 904c and 904d) to execute multiple threads of a program. The cores may be configured to execute instruction code in a manner similar to that discussed above with reference to FIGS. 1-8. Each processor 902a and 902b may include at least one shared cache 906a and 906b respectively. Shared caches 906a and 906b may each store data (e.g., instructions) that are utilized by one or more components of processors 902a and 902b, such as processor cores 904a and 904b of processor 902a and processor cores 904c and 904d of processor 902b.

Processors 902a and 902b may also each include integrated memory controller logic (MC) 908a and 908b respectively to communicate with memory elements 910a and 910b. Memory elements 910a and/or 910b may store various data used by processors 902a and 902b. In alternative embodiments, memory controller logic 908a and 908b may be discrete logic separate from processors 902a and 902b.

Processors 902a and 902b may be any type of processor and may exchange data via a point-to-point (PtP) interface 912 using point-to-point interface circuits 914a and 914b respectively. Processors 902a and 902b may each exchange data with a chipset 916 via individual point-to-point interfaces 918a and 918b using point-to-point interface circuits 920a-920d. Chipset 916 may also exchange data with a high-performance graphics circuit 922 via a high-performance graphics interface 924, using an interface circuit 926, which could be a PtP interface circuit. In alternative embodiments, any or all of the PtP links illustrated in FIG. 9 could be implemented as a multi-drop bus rather than a PtP link.

Chipset 916 may be in communication with a bus 928 via an interface circuit 930. Bus 928 may have one or more devices that communicate over it, such as a bus bridge 932 and I/O devices 934. Via a bus 936, bus bridge 932 may be in communication with other devices such as a keyboard/mouse 938 (or other input devices such as a touch screen, trackball, etc.), communication devices 940 (such as modems, network interface devices, or other types of communication devices that may communicate through a network), audio I/O devices 942, and/or a data storage device 944. Data storage device 944 may store code 946, which may be executed by processors 902a and/or 902b. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
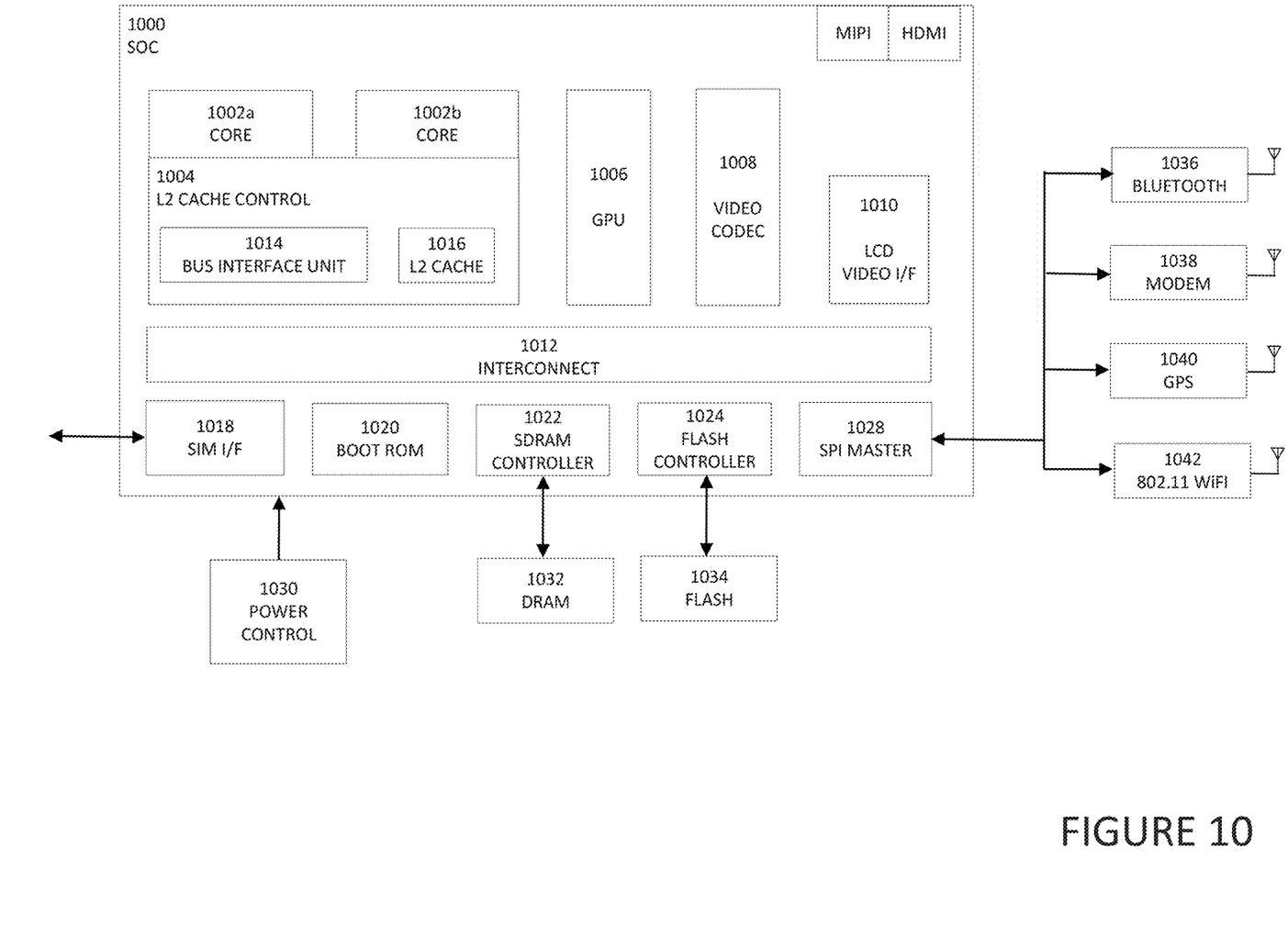
FIG. 10 is a simplified block diagram associated with an example ARM ecosystem system on chip (SOC) of the present disclosure.

Turning to FIG. 10, FIG. 10 is a simplified block diagram associated with an example ecosystem SOC 1000 of the present disclosure. At least one example implementation of the present disclosure can include the device pairing in a local network features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 10, ecosystem SOC 1000 may include multiple cores 1002a and 1002b, an L2 cache control 1004, a graphics processing unit (GPU) 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/high-definition multimedia interface (HDMI) links that couple to an LCD.

Ecosystem SOC 1000 may also include a subscriber identity module (SIM) I/F 1018, a boot read-only memory (ROM) 1020, a synchronous dynamic random-access memory (SDRAM) controller 1022, a flash controller 1024, a serial peripheral interface (SPI) master 1028, a suitable power control 1030, a dynamic RAM (DRAM) 1032, and flash 1034. In addition, one or more embodiments include one or more communication capabilities, interfaces, and features such as instances of Bluetooth™ 1036, a 3G modem 1038, a global positioning system (GPS) 1040, and an 802.11 Wi-Fi 1042.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
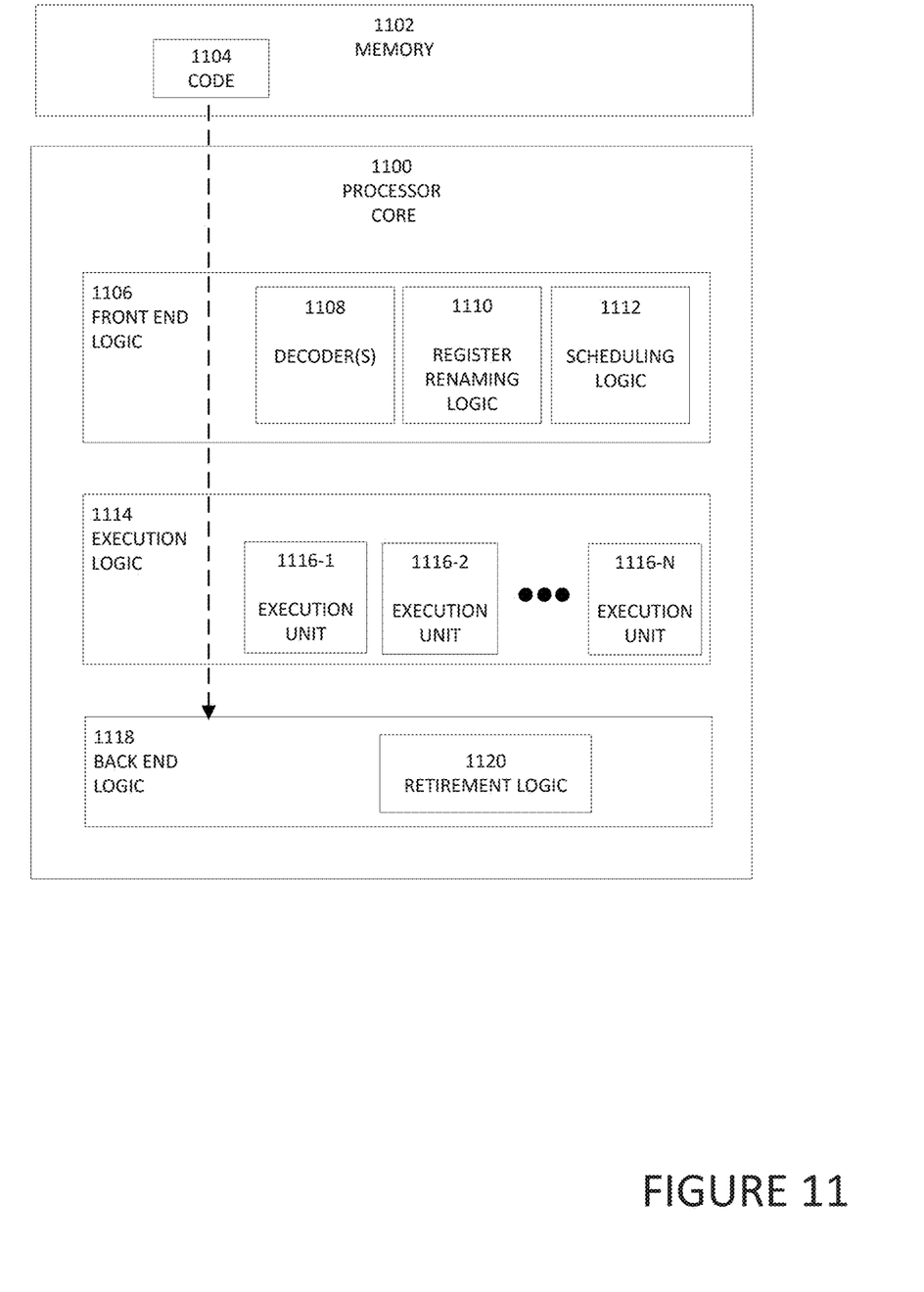
FIG. 11 is a block diagram illustrating an example processor core in accordance with an embodiment.

Turning to FIG. 11, FIG. 11 illustrates a processor core 1100 according to an embodiment. Processor core 1100 may be the core for any type of processor, such as a microprocessor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 904a-904d shown and described with reference to processors 902a and 902b of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 9. For example, as shown in FIG. 9, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagrams (i.e., FIG. 7) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a first housing, a second housing, where the second housing is rotatably coupled to the first housing using a hinge, and at least one thermal sensor to detect a position of a user relative to the electronic device, where the thermal sensor includes an array of thermopiles.

In Example A2, the subject matter of Example A1 can optionally include where each thermopile can detect a presence of the user by comparing an ambient temperature value to a current temperature value.

In Example A3, the subject matter of any one of Examples A1-A2 can optionally include where the array of thermopiles is at least a three-by-three array of thermopiles.

In Example A4, the subject matter of any one of Examples A1-A3 can optionally include where each thermopile has a different field of view.

In Example A5, the subject matter of any one of Examples A1-A4 can optionally include where a Fresnel lens is used to create the different fields of view.

In Example A6, the subject matter of any one of Examples A1-A5 can optionally include where the electronic device is a clamshell computer that includes a display.

In Example A7, the subject matter of any one of Examples A1-A6 can optionally include where an image on the display is adjusted based on the detected position of the user.

In Example A8, the subject matter of any one of Examples A1-A7 can optionally include where the electronic device includes at least three thermal sensors and each thermal sensor has a different field of view.

Example M1 is a method including determining an ambient temperature, determining a current temperature with a thermopile, where the thermopile is part of an array of thermopiles in a thermal sensor, and determining a position of a user by comparing, at least in part, the determined current temperature and the determined ambient temperature.

In Example M2, the subject matter of Example M1 can optionally include where the array of thermopiles is at least a three-by-three array of thermopiles.

In Example M3, the subject matter of any one of the Examples M1-M2 can optionally include where the thermal sensor is used to collect data related a position of the user.

In Example M4, the subject matter of any one of the Examples M1-M3 can optionally include where each thermopile in the array of thermopiles has a different field of view.

In Example M5, the subject matter of any one of the Examples M1-M4 can optionally include where a Fresnel lens is used to create the different fields of view.

In Example M6, the subject matter of any one of the Examples M1-M5 can optionally include where a user position engine receives data from each thermopile in the array of thermopiles and uses the received data to determine the position of the user.

Example C1 is at least one machine readable storage medium having one or more instructions that when executed by at least one processor, cause the at least one processor to determine an ambient temperature, determine a current temperature with a thermopile, where the thermopile is part of an array of thermopiles in a thermal sensor, and determine a position of a user by comparing, at least in part, the determined current temperature and the determined ambient temperature.

In Example C2, the subject matter of Example C1 can optionally include where the array of thermopiles is at least a three-by-three array of thermopiles.

In Example C3, the subject matter of any one of Examples C1-C2 can optionally include where the thermal sensor is used to collect data related a position of the user.

In Example C4, the subject matter of any one of Examples C1-C3 can optionally include where each thermopile in the array of thermopiles has a different field of view.

In Example C5, the subject matter of any one of Examples C1-C4 can optionally include where a Fresnel lens is used to create the different fields of view.

In Example C6, the subject matter of any one of Examples C1-C5 can optionally include where a user position engine receives data from each thermopile in the array of thermopiles and uses the received data to determine the position of the user.

Example S1 is a system for a determining a position of a user. The system can include at least one thermal sensor, where the thermal sensor includes an array of thermopiles to detect a presence of a user, and a user position engine, where the user position engine determines a relative position of the user based on data from the at least one thermal sensor.

In Example S2, the subject matter of Example S1 can optionally include where each thermopile can detect the presence of the user by comparing an ambient temperature value to a current temperature value.

In Example S3, the subject matter of any one of the Examples S1-S2 can optionally include where each thermal sensor has a different field of view.

In Example S4, the subject matter of any one of the Examples S1-S3 can optionally include where a Fresnel lens is used to create the different fields of view.

In Example S5, the subject matter of any one of the Examples S1-S4 can optionally include where the system is part of an electronic device that includes a display.

In Example S6, the subject matter of any one of the Examples S1-S5 can optionally include where the electronic device includes at least three thermal sensors and each thermal sensor has a different field of view.

Example AA1 is an apparatus including a first housing, a second housing, where the second housing is rotatably coupled to the first housing using a hinge, and at least one thermal sensor to detect a position of a user relative to the electronic device, where the thermal sensor includes an array of thermopiles.

In Example AA2, the subject matter of Example AA1 can optionally include where each thermopile can detect a presence of the user by comparing an ambient temperature value to a current temperature value.

In Example AA3, the subject matter of any one of Examples AA1-AA2 can optionally include where the array of thermopiles is at least a three-by-three array of thermopiles.

In Example AA4, the subject matter of any one of Examples AA1-AA3 can optionally include where each thermopile has a different field of view.

In Example AA5, the subject matter of any one of Examples AA1-AA4 can optionally include where a Fresnel lens is used to create the different fields of view.

In Example AA6, the subject matter of any one of Examples AA1-AA5 can optionally include where the electronic device is a clamshell computer that includes a display.

In Example AA7, the subject matter of any one of Examples AA1-AA6 can optionally include where an image on the display is adjusted based on the detected position of the user.

In Example AA8, the subject matter of any one of Examples AA1-AA7 can optionally include where the electronic device includes at least three thermal sensors and each thermal sensor has a different field of view Example X1 is a machine-readable storage medium including machine-readable instructions to implement a method or realize an apparatus as in any one of the Examples A1-A8, AA1-AA8, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a first housing;
   a second housing, wherein the second housing is rotatably coupled to the first housing using a hinge; and
   at least one thermal sensor to detect a position of a user relative to the electronic device, wherein detecting the position of the user includes determining whether the user is in one of a plurality of zones, wherein one zone is an approximate middle area of the electronic device, wherein the thermal sensor includes an array of thermopiles on an outside portion of the first housing and/or the second housing, wherein the array of thermopiles includes at least two columns and at least two rows.

2. The electronic device of claim 1, wherein each thermopile can detect a presence of the user by comparing an ambient temperature value to a current temperature value.

3. The electronic device of claim 1, wherein the array of thermopiles is at least a three-by-three array of thermopiles.

4. The electronic device of claim 3, wherein each thermopile has a different field of view.

5. The electronic device of claim 4, wherein a Fresnel lens is used to create the different fields of view.

6. The electronic device of claim 1, wherein the electronic device is a clamshell computer that includes a display.

7. The electronic device of claim 6, wherein an image on the display is adjusted based on the detected position of the user.

8. The electronic device of claim 1, wherein the electronic device includes at least three thermal sensors, wherein a first thermal sensor is located on a first side of the first housing and a second thermal sensor is located on a second opposite side of the first housing and each thermal sensor has a different field of view.

9. A method comprising:
   determining an ambient temperature;
   determining a current temperature with a thermopile, wherein the thermopile is part of an array of thermopiles in a thermal sensor, wherein the array of thermopiles includes at least two columns and at least two rows and is located on an outside portion of a first housing and/or a second housing of an electronic device; and
   determining a position of a user by comparing, at least in part, the determined current temperature and the determined ambient temperature wherein detecting the position of the user includes determining whether the user is in one of a plurality of zones, wherein one zone is an approximate middle area of the electronic device.

10. The method of claim 9, wherein the array of thermopiles is at least a three-by-three array of thermopiles.

11. The method of claim 9, wherein each thermopile in the array of thermopiles has a different field of view.

12. The method of claim 11, wherein a Fresnel lens is used to create the different fields of view.

13. The method of claim 9, wherein a user position engine receives data from each thermopile in the array of thermopiles and uses the received data to determine the position of the user.

14. A system comprising:
 at least one thermal sensor, wherein the thermal sensor includes an array of thermopiles to detect a presence of a user, wherein the array of thermopiles includes at least two columns and at least two rows and is located on an outside portion of a first housing and/or a second housing of the system; and
 a user position engine, wherein the user position engine determines a relative position of the user based on data from the at least one thermal sensor, wherein detecting the position of the user includes determining whether the user is in one of a plurality of zones, wherein one zone is an approximate middle area of the first housing and/or the second housing of the system.

15. The system of claim 14, wherein each thermopile can detect the presence of the user by comparing an ambient temperature value to a current temperature value.

16. The system of claim 14, wherein each thermal sensor has a different field of view.

17. The system of claim 16, wherein a Fresnel lens is used to create the different fields of view.

18. The system of claim 14, wherein the system is part of an electronic device that includes a display.

19. The system of claim 18, wherein the electronic device includes at least three thermal sensors and each thermal sensor has a different field of view.

20. The electronic device of claim 1, wherein the electronic device includes a display and the array of thermopiles determines if a user is left or right of a center portion of the display and/or is above or below the center portion of the display.

* * * * *